United States Patent
Rist et al.

(10) Patent No.: US 10,658,887 B2
(45) Date of Patent: May 19, 2020

(54) LAMINATION PACK FOR PRODUCING STATORS AND/OR ROTORS OF ELECTRIC MOTORS AND GENERATORS

(71) Applicant: Kienle + Spiess GmbH, Sachsenheim (DE)

(72) Inventors: Rudolf Rist, Sachsenheim (DE); Marc Hertfelder, Vaihingen (DE); Björn Böker, Esslingen (DE)

(73) Assignee: Kienle + Spiess GmbH, Sachsenheim (DE)

( * ) Notice: Subject to any disclaimer, the term of this patent is extended or adjusted under 35 U.S.C. 154(b) by 36 days.

(21) Appl. No.: 15/494,602

(22) Filed: Apr. 24, 2017

(65) Prior Publication Data
US 2017/0310170 A1    Oct. 26, 2017

(30) Foreign Application Priority Data
Apr. 26, 2016   (DE) .................. 10 2016 005 329

(51) Int. Cl.
*H02K 1/18* (2006.01)
*H02K 1/06* (2006.01)
*H02K 1/04* (2006.01)
*H02K 15/02* (2006.01)

(52) U.S. Cl.
CPC ............. *H02K 1/18* (2013.01); *H02K 1/04* (2013.01); *H02K 1/06* (2013.01); *H02K 15/02* (2013.01); *H02K 2201/09* (2013.01)

(58) Field of Classification Search
CPC .. H02K 1/18; H02K 1/04; H02K 1/06; H02K 1/16; H02K 15/024; H02K 3/46; H02K 15/02; H02K 2201/09; Y10T 29/49009
USPC ..... 310/260, 216.004, 72, 216.129, 216.051, 310/216.076, 216.029; 29/596
See application file for complete search history.

(56) References Cited

U.S. PATENT DOCUMENTS

| | | | |
|---|---|---|---|
| 4,538,345 A | 9/1985 | Diederichs | |
| 6,645,886 B1 | 11/2003 | Muhrer et al. | |
| 6,720,692 B2 | 4/2004 | Bell | |
| 9,502,939 B2* | 11/2016 | Kinpara | H02K 1/16 |
| 2008/0042499 A1 | 2/2008 | Okada | |
| 2008/0303362 A1 | 12/2008 | Nakajima et al. | |
| 2010/0181875 A1* | 7/2010 | Tamaoka | G11B 19/2009 310/425 |
| 2013/0154434 A1* | 6/2013 | Hasegawa | H02K 1/16 310/216.004 |
| 2015/0008787 A1* | 1/2015 | Tanavde | H02K 1/16 310/260 |
| 2015/0028717 A1* | 1/2015 | Luo | H02K 1/16 310/216.054 |

FOREIGN PATENT DOCUMENTS

| | | |
|---|---|---|
| DE | 10 2014 213 517 | 1/2016 |
| JP | H11132458 | 2/1999 |
| JP | 2000050539 | 2/2000 |

* cited by examiner

*Primary Examiner* — Alfonso Perez Borroto
*Assistant Examiner* — Leda T Pham
(74) *Attorney, Agent, or Firm* — Gudrun E. Huckett

(57) ABSTRACT

A lamination pack for producing stators and/or rotors of electric motors and generators has laminations, stacked and fixedly connected to each other, between which electrically insulating layers are provided. The laminations are connected to each other outside of the electrically insulating layers by an electrically conducting connection.

10 Claims, 5 Drawing Sheets

LAMINATION PACK FOR PRODUCING STATORS AND/OR ROTORS OF ELECTRIC MOTORS AND GENERATORS

BACKGROUND OF THE INVENTION

The invention concerns a lamination pack for producing, stators and/or rotors of electric motors and generators, comprising laminations, stacked on each other and fixedly connected to each other, between which electrically insulating layers are provided.

PRIOR ART

Lamination packs 1 are assembled of punched laminations 2 which are stacked on each other and fixedly connected to each other (FIGS. 1 and 2). The electrical sheet steel used for producing the laminations is provided on at least one side with an electrically insulating coating 3 that ensures that only minimal eddy current losses are generated in future use in the electric motor or generator. However, due to these electrically insulating layers an insulation test, for example, between copper winding and lamination pack 1 is made difficult. The insulating layers 3 in sum total can have a relatively high resistance value, for example, of 1,000 Ohm. For an insulation test, it is however expedient to reduce the total resistance to significantly smaller values, for example, 10 Ohm. In order for this minimal resistance of the lamination pack 1 to be achieved and to be tested, the laminations 2 within the lamination pack 1 must be connected electrically conductingly. For this purpose, the laminations 2 within the lamination pack 1 are welded together so that neighboring laminations 2 within the lamination pack 1 are electrically conductingly connected to each other. These weld connections however destroy the electrically insulating layers 3 in the area of the weld connection. This has the result that the eddy current losses increase correspondingly.

SUMMARY OF THE INVENTION

The invention has the object to configure the lamination pack of the aforementioned kind for measuring purposes, prior or after winding with copper wire, in such a way that the resistance test can be performed in a simple way without obtaining a significant impairment of the eddy current losses in the lamination pack.

This object is solved for the lamination pack of the aforementioned kind in accordance with the invention in that the laminations are connected to each other outside of the electrically insulating layers by an electrically conducting connection.

In the lamination pack according to the invention, the laminations are electrically contacted with each other by the electrically conducting connection outside of the electrically insulating layers. Because this connection is realized outside of the electrically insulating layers, these layers remain undamaged so that the desired only very minimal eddy current losses are maintained. The electrically conducting connection ensures that the resistance test of the lamination pack can be performed in a simple way and with high precision. No screws or bolts that penetrate the lamination pack are required for the electrically conducting connection of the laminations within the lamination pack.

Advantageously, the electrically conducting connection is provided at a cut surface of the lamination pack. The cut surfaces are formed by the rims of the laser-cut or punched laminations which are free of the insulating layers. Therefore, the electrically conducting connection can be applied very easily at the cut surface of the lamination pack so that the laminations stacked on each other within the lamination pack are connected to each other electrically conductingly.

In a particularly simple embodiment, the electrically conducting connection extends parallel to the axis of the lamination pack. This arrangement of the electrically conducting connection enables with regard to process technology a simple manufacture of the lamination pack with this connection. For the insulation test and/or resistance measurement, it is sufficient that the electrically conducting connection is very small relative to the circumferential length of the lamination pack.

In an advantageous embodiment, the electrically conducting connection is formed by an electrically conducting adhesive or varnish. It can be applied easily on the lamination pack and is inexpensive.

However, an electrically conducting adhesive tape can be used also as an electrically conducting connection. It is comprised, for example, of copper or aluminum. Such an adhesive tape can also be attached to the lamination pack as an inexpensive product in a simple and problem-free way. The adhesive tape can also be coated with electrically conductive adhesive. The electrically conductive adhesive can also be provided only partially, for example, in longitudinal strips, on the adhesive tape.

It is moreover possible to fold the adhesive tape at one end in order to ensure a very good contacting action.

The laminations can be annularly punched parts. In this case, the lamination pack is comprised of such annular punched parts which are separated from each other by the electrically insulating layers, respectively.

The laminations must not be formed as one piece but can also be formed of punched individual teeth joined end to end. Such individual teeth have, for example, a radially extending pole shaft as well as a pole shoe adjoined thereto. By means of the end faces of the pole shoes, the individual teeth are assembled to form the annular lamination. In such punched individual teeth, the punched rims are also free of the electrically insulating layer so that these punched rims of the individual teeth in the lamination pack have areas extending across the pack height where the electrically conducting connection can be provided in a simple way.

Within the lamination pack, the laminations can be fixedly connected to each other with form fit by projections and recesses. Such projections and recesses are formed in that local embossments are created on the laminations which exhibit on one lamination side the projections and on the other lamination side the corresponding recesses. When stacking the laminations, the laminations with their projections engage the recesses of the respective neighboring laminations. In this way, the laminations within the lamination pack can be fixedly connected to each other.

In another advantageous embodiment, the laminations are fixedly connected to each other by an adhesive. In this case, plastic deformations of the laminations are not required. The adhesive is selected such that the laminations within the lamination pack can be connected to each other with high strength. The adhesive can be applied onto the respective laminations across the entire surface area, across a partial surface area, in a linear shape, in a dot shape and the like.

It is advantageous when in such a case the adhesive contains electrically conducting particles. They penetrate locally minimally the insulation layers between the neighboring laminations when the laminations are compressed to lamination packs and produce the electrical connection of neighboring laminations in this way. Since the particles have only a very minimal size, the electrically insulating layer between the neighboring laminations is mostly maintained so that, despite the particle penetration of these electrically insulating layers, the lamination pack exhibits only minimal eddy current losses. The electrically conducting particles ensure in this context that the stacked laminations within the lamination pack are reliably connected to each other in an electrically conducting way so that a resistance test can be easily performed.

The subject matter of the application results not only from the subject matter of the individual claims but also from all the specifications and features disclosed in the drawing and the description. Even if they are not subject matter of the claims, they are claimed as important to the invention inasmuch as they are novel individually or in combination relative to the prior art.

Further features of the invention result from the further claims, the description, and the drawings.

BRIEF DESCRIPTION OF THE DRAWINGS

The invention will be explained in more detail with the aid of two embodiments illustrated in the drawings in more detail.

DESCRIPTION OF PREFERRED EMBODIMENTS

Figure 1:
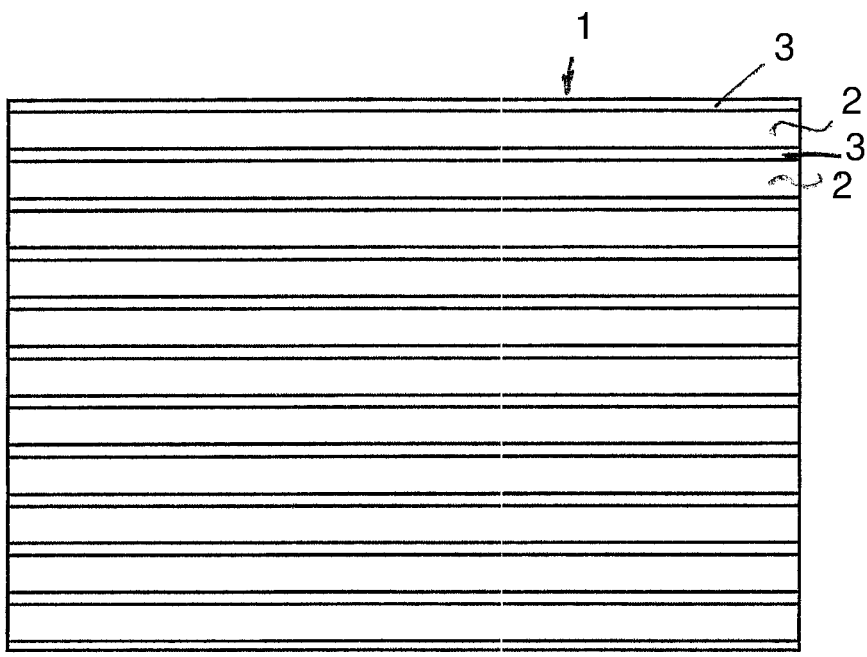
FIG. 1 is a side view of a lamination pack according to the prior art.
Figure 2:
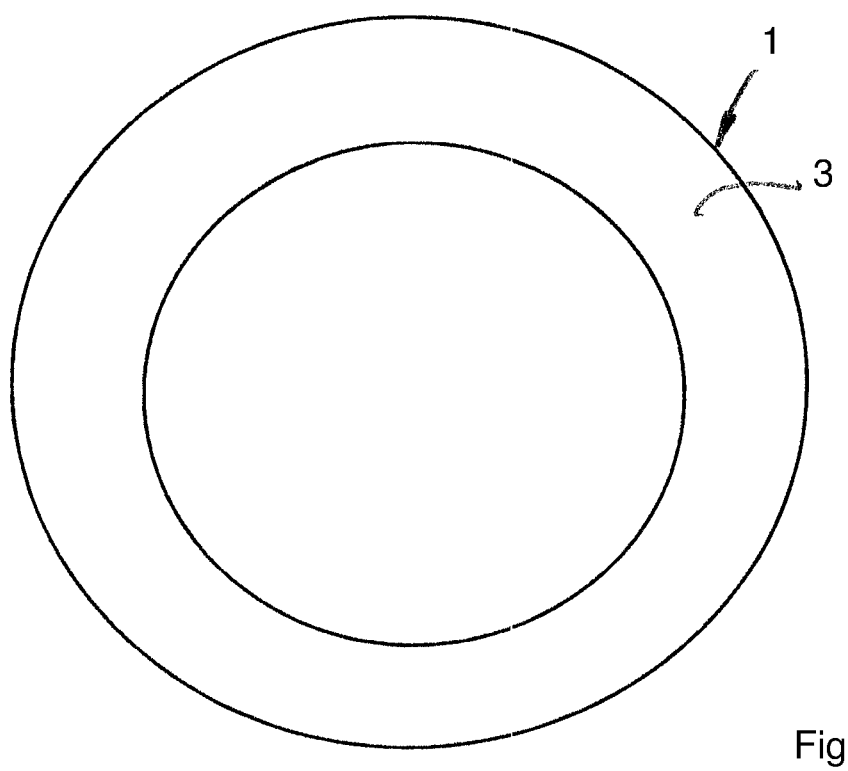
FIG. 2 is a plan view onto the lamination pack according to FIG. 1.
Figure 3:
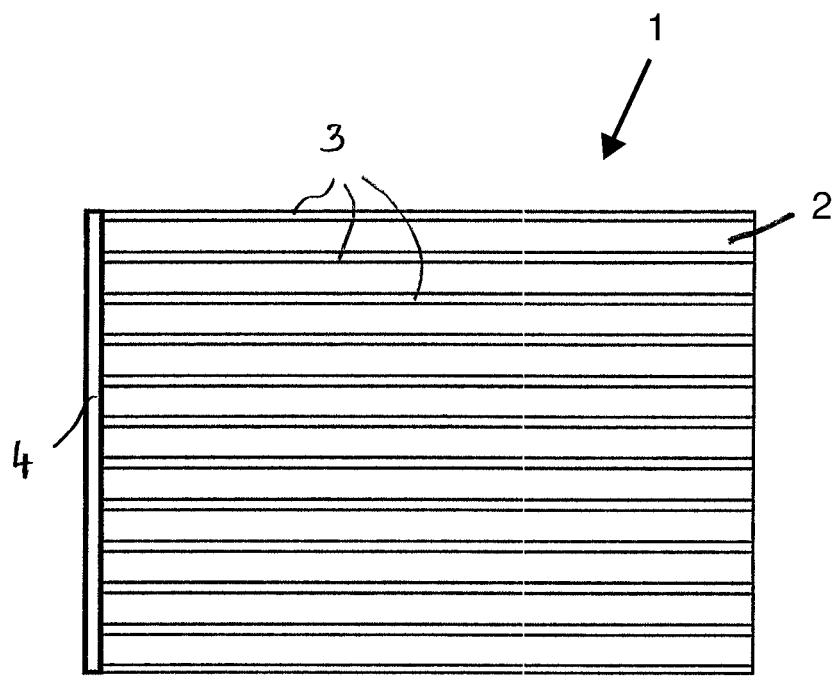
FIG. 3 is an illustration corresponding to FIG. 1 of a first embodiment of a lamination pack according to the invention.
Figure 4:
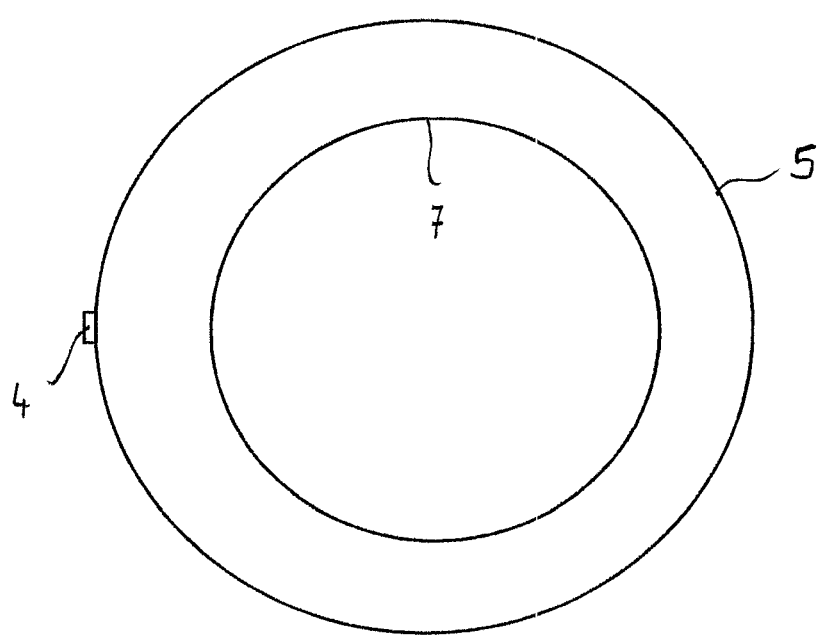
FIG. 4 is an illustration corresponding to FIG. 2 of the first embodiment of a lamination pack according to the invention as shown in FIG. 3.

The lamination pack 1 according to FIGS. 3 and 4 is comprised of stacked annular laminations 2 that are punched in a known way from a sheet metal strip. The lamination packs 1 are used in rotors or stators of electric motors or generators. The laminations 2 are schematically illustrated in FIG. 4 as rings. Of course, they have the required shape for the respective application.

Figure 7:
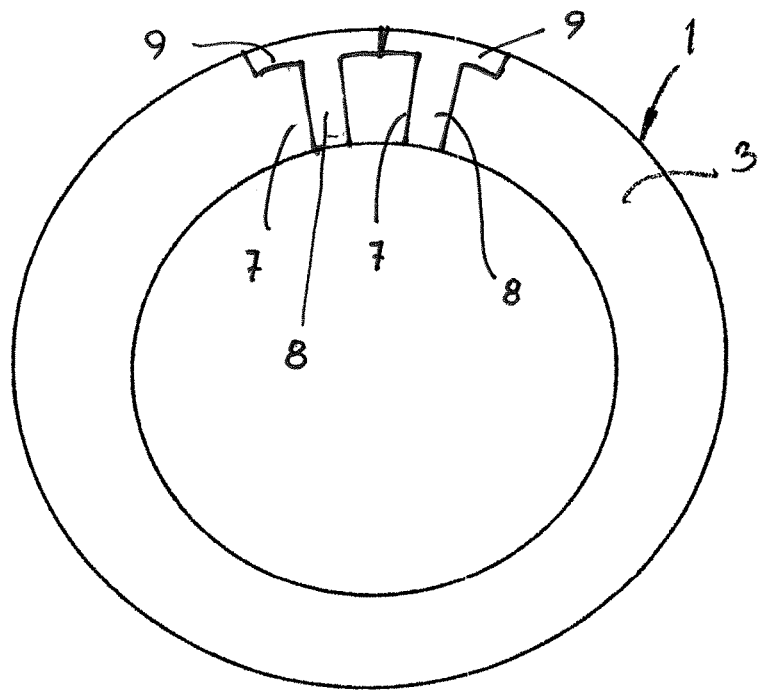
FIG. 7 shows lin a plan view a third embodiment of a lamination pack according to the invention assembled of individual teeth.

The laminations can also be assembled of individual teeth 7 (FIG. 7). Such individual teeth 7 have a radially extending pole shaft 8, supporting an excitation coil, as well as an adjoining pole shoe 9 that is extending in a curved shape. The individual teeth 7 are assembled with their pole shoes 9 contacting each other to form a ring. FIG. 7 shows only two such individual teeth 7.

Figure 8:
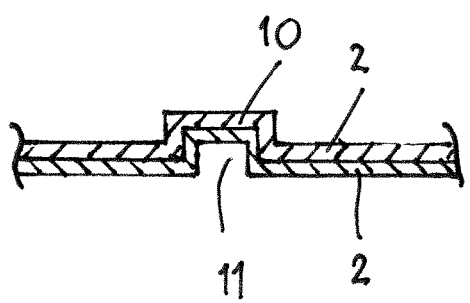
FIG. 8 shows in enlarged illustration and in section view two stacked laminations of a lamination pack according to the invention that are connected with form fit to each other.

The individual laminations 2 are connected fixedly to each other within the lamination pack 1. This fixed connection can be achieved by form fit (FIG. 8). In this case, the laminations 2 have projections 10 that are projecting past their plane and are formed by appropriate partial deformation of the laminations 2 during the punching process. With these projections 10, the laminations engage corresponding recesses 11 of the respectively neighboring lamination. The projections 10 which are projecting past one lamination side and the recesses 11 which are correspondingly formed on the oppositely positioned lamination side are arranged so as to be distributed about the circumference of the laminations 2.

Figure 9:
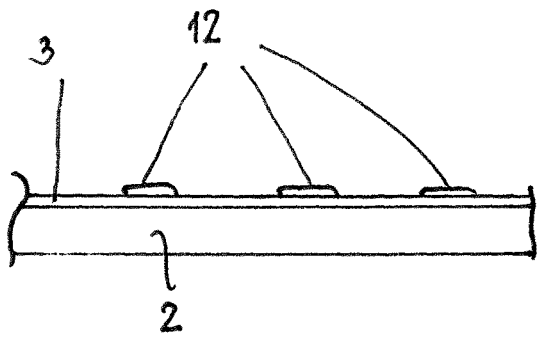
FIG. 9 shows in schematic illustration a part of a lamination of the lamination pack according to the invention that is provided with adhesive on one side.

Apart from this form fit connection, it is also possible to fixedly connect the stacked laminations to each other, for example, at their outer wall surface 5 by welding, for example, by laser welding, or friction welding. Also, it is possible to fixedly connect the laminations 2 to each other by an adhesive method. The adhesive 12 can be applied to the laminations 2 across a partial surface area, across the entire surface area, or only in the form of dots (FIG. 9). FIG. 9 illustrates only one of the laminations 2 provided on one side with the adhesive 12. When onto this lamination the next lamination is placed, the adhesive 12 provides for the fixed connection between the laminations 2.

It is finally also possible to fixedly connect the stacked laminations 2 to each other by form fit as well as by means of an adhesive.

The individual laminations 2 are connected to each other such that the electrically insulating layer 3 on the laminations 2 is not damaged, which would be the case if the laminations were penetrated by screws or bolts in order to fixedly connect the laminations to each other. Then the laminations 2 would have to have through openings for the screws/bolts.

The electrical sheet steel from which the laminations are punched is covered on both sides with the electrical insulation layer 3. In this way, it is achieved that the stator or rotor which contains the lamination pack has only minimal eddy current losses in use.

In order to be able to perform a resistance test reliably but still simply without impairing the insulation layers 3 and thus the electrical insulation of the individual laminations 2, it is provided in the embodiment according to FIGS. 3 and 4 to provide on the circumference of the lamination pack 1 at least one electrically conducting connection 4 which extends across the height of the lamination pack 1. In the embodiment, this electrically conducting connection 4 is extending axis-parallel but can also be positioned at a slant.

For the electrically conducting connection, for example, a corresponding conductive tape can be used that is preferably comprised of copper or aluminum. The tape is advantageously an adhesive tape. Such an adhesive tape can be attached very easily to the outer wall surface 5 of the lamination pack 1 and, as needed, can also be removed again. For the connection 4, a corresponding electrically conductive plastic material or varnish can be employed also which can be applied likewise very easily to the wall surface 5 across the height of the lamination pack 1.

In the embodiment, the lamination pack 1 has on the outer wall surface 5 only a single electrically conducting connection. The lamination pack 1 can however have at least one additional such electrically conducting connection.

As a result of the punching process, there is no insulation layer on the wall surface 5 of the lamination pack 1. It is only present on the top side and the bottom side of the laminations 2. By means of the connection 4, the individual laminations 2 within the lamination pack 1 are thus electrically conductingly connected to each other. In this way, a resistance measurement of the lamination pack 1 can be performed very simply but still precisely. The use of the electrically conducting connection in the form of the adhesive or the adhesive tape has the advantage that the microstructure of the individual laminations 2 is not damaged by the connection 4 as would be the case, for example, by a welding process.

After the resistance measurement, the electrically conducting connection 4 can be removed. In this way, it is ensured that no eddy current losses are generated by connections 4 that are remaining on the lamination pack 1.

It is even possible to leave the electrically conducting connection 4 on the lamination pack 1 because it affects the eddy current losses in the end product only minimally. However, it is advantageous to remove the electrically conducting connection 4 after the measuring process. This is possible without problems in particular when an adhesive tape has been used for the connection 4. It can be easily pulled off after the measuring process.

When the lamination ring is assembled of individual teeth 7 (FIG. 7) which, in turn, are comprised of corresponding stacked individual laminations, then the resistance test can be performed on the individual tooth 7, comprised of the layered and fixedly connected laminations, as well as on the lamination pack assembled of the individual teeth 7.

When using individual teeth 7, the individual laminations have the radially extending pole shaft 8 as well as the pole shoe 9. These laminations are punched in the known way from the electrical sheet steel that is provided with the electrical insulation layer 3 on both sides. Due to the punching process, on the rims of the tooth-shaped laminations no insulation layers are present. When the laminations are layered and fixedly connected to each other to form the individual tooth, these rims that are free of the insulation layer 3 form outer surfaces of the individual tooth where the electrically conducting connection for the resistance measurement 4 can be provided. When each individual tooth is tested, this connection 4 can in principle be applied to any outer side of the individual tooth but not on the two exterior sides of the individual tooth that are provided with the insulation layer 3. When the individual teeth are first joined to the annular lamination pack 1, then the electrically conducting connection 4 is applied to the outer wall surface 5 of the lamination pack 1, as has been explained with the aid of FIGS. 3 and 4.

Figure 5:
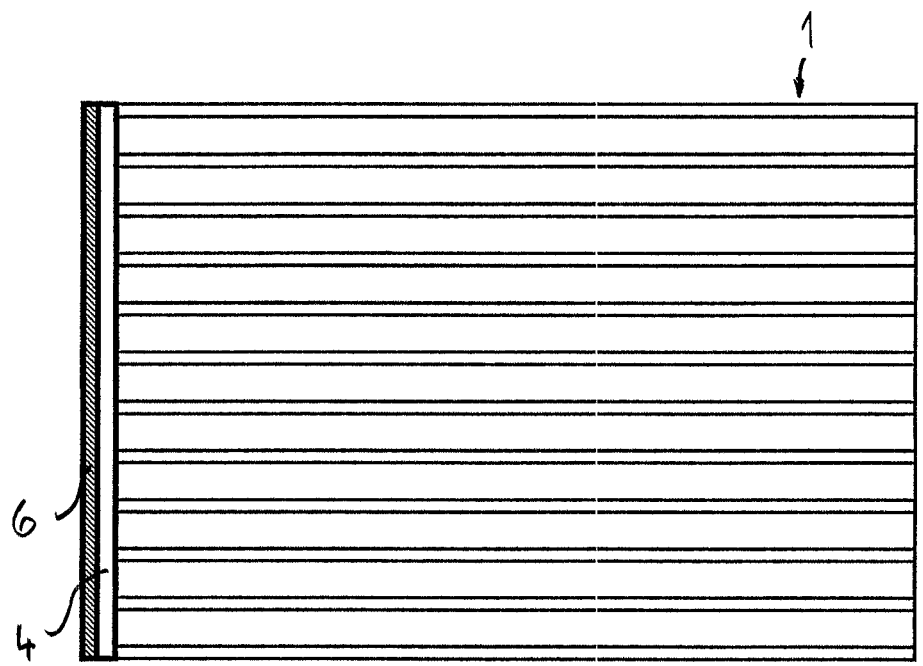
FIG. 5 is an illustration corresponding to FIG. 1 of a second embodiment of a lamination pack according to the invention.
Figure 6:
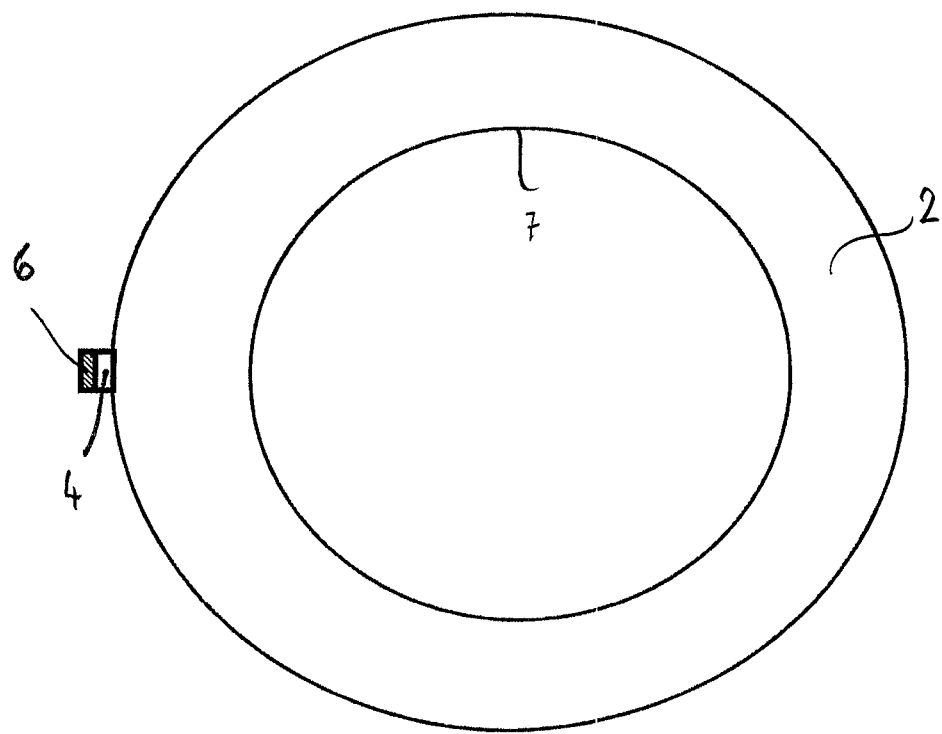
FIG. 6 is an illustration corresponding to FIG. 2 of the second embodiment of a lamination pack according to the invention as shown in FIG. 5.

While in the embodiment according to FIGS. 3 and 4 the electrically conductive adhesive or electrically conductive varnish or the electrically conducting tape is used for the electrically conducting connection 4, in the embodiment according to FIGS. 5 and 6 the electrically conductive adhesive or varnish and the electrically conductive tape 6 are used in combination.

This electrically conducting connection 4, 6 is applied in the same way to the lamination pack 1 as in the preceding embodiment so that reference is being had to the explanations provided there. The adhesive tape 6 is arranged on the adhesive/varnish 4.

Figure 10:
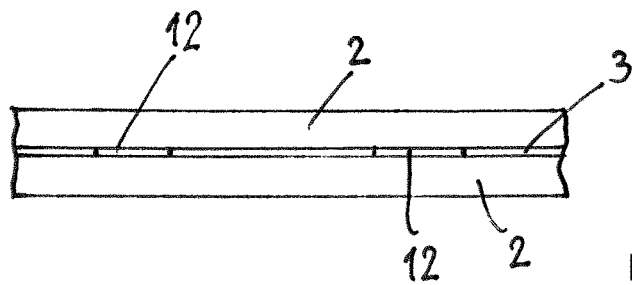
FIG. 10 shows in schematic illustration two stacked laminations that are electrically conductingly connected to each other by an adhesive containing electrically conducting particles.
Figure 11:
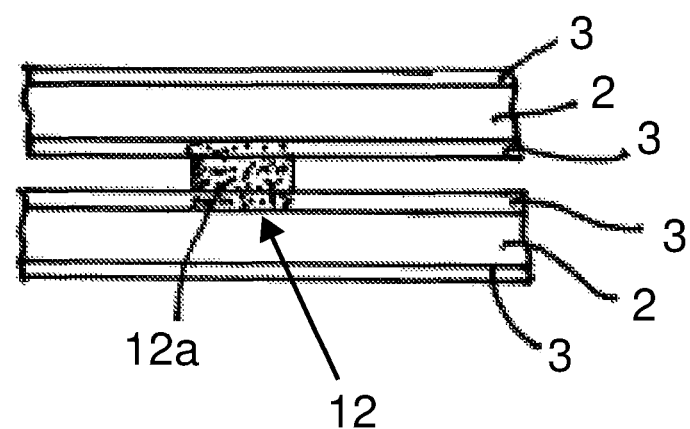
FIG. 11 illustrates schematically the electrically conducting connection between two laminations provided by an adhesive containing electrically conducting particles that penetrate the insulation layers of the laminations.

In the two disclosed embodiments, the electrically conducting connection, which relative to the circumferential length of the lamination pack is very small, is located on the outer wall surface 5 of the lamination pack 1. The electrically conducting connection 4, 6 can however also be applied to the inner wall surface 7 of the lamination pack 1. In a further embodiment (FIG. 10 and FIG. 11), the electrically conducting connection is located between the laminations 2 within the lamination pack 1. In this case, the laminations 2 are connected by an adhesive 12 to each other that contains electrically conducting particles 12a. This adhesive 12 is designed such that, upon compression of the laminations 2 for producing the lamination pack 1, the electrically conducting particles 12a penetrate the insulation layers 3 on the laminations 2. In this way, by means of the electrically conducting particles 12a an electrically conducting connection of the laminations 2 with each other within the lamination pack 1 is achieved.

Since the electrically conducting connection within the lamination pack 1 is located between neighboring laminations 2, it cannot be removed after resistance measurement. This leads to somewhat higher eddy current losses which however are minimal so that they are not important in practical use. The adhesive 12 containing the electrically conducting particles must not be provided about the entire circumference of the laminations 2. It is sufficient that it is provided only locally on the laminations 2. It must be applied only in such a way that a reliable resistance measurement can be performed. In this way, it is advantageously possible to keep as minimal as possible the eddy current losses due to the electrically conducting adhesive 12 remaining in the lamination pack 1.

The electrically conducting adhesive 12 can be used not only for the annular laminations 2 but also for the laminations from which the individual teeth are formed.

The specification incorporates by reference the entire disclosure of German priority document 10 2016 005 329.1 having a filing date of 26 Apr. 2016.

While specific embodiments of the invention have been shown and described in detail to illustrate the inventive principles, it will be understood that the invention may be embodied otherwise without departing from such principles.

What is claimed is:

1. A lamination pack for producing stators and/or rotors of electric motors and generators, the lamination pack comprising:
   laminations, stacked on each other and fixedly connected to each other;
   electrically insulating layers provided between the laminations, respectively, wherein the electrically insulating layers completely cover the laminations on both sides, respectively, and wherein outer peripheral cut surfaces of the laminations are free of the electrically insulating layers;
   wherein all of the laminations are connected to each other within the lamination pack by an electrically conducting connection connected to the outer peripheral cut surfaces that are free of the electrically insulating layers, wherein the electrically conducting connection is provided for resistance measuring of the lamination pack and is removed after a resistance measurement of the lamination pack has been carried out.

2. The lamination pack according to claim 1, wherein the electrically conducting connection is extending parallel to an axis of the lamination pack.

3. The lamination pack according to claim 1, wherein the electrically conducting connection is formed by an electrically conductive adhesive or varnish.

4. The lamination pack according to claim 1, wherein the electrically conductive connection is an electrically conducting adhesive tape.

5. The lamination pack according to claim 4, wherein the adhesive tape at least partially is coated with an electrically conductive adhesive.

6. The lamination pack according to claim 1, wherein the laminations are annular punched parts.

7. The lamination pack according to claim 1, wherein the laminations are formed of punched individual teeth joined end to end.

8. The lamination pack according to claim 1, wherein the laminations each have a first lamination side and a second lamination side facing away from the first lamination side, wherein the laminations each comprise projections that are projecting from the first lamination side and form corresponding recesses on the second lamination side.

9. The lamination pack according to claim 1, wherein the laminations in the lamination pack are connected to each other by an adhesive.

10. A lamination pack for producing stators and/or rotors of electric motors and generators, the lamination pack comprising:
    laminations, stacked on each other and fixedly connected to each other;
    electrically insulating layers provided between the laminations and covering the laminations on both sides, respectively;
    wherein the laminations in the lamination pack are fixedly connected to each other by an adhesive applied between the laminations;
    wherein the laminations are connected to each other within the lamination pack by an electrically conducting connection;
    wherein the adhesive comprises electrically conducting particles which penetrate the electrically insulating layers and the adhesive electrically conductingly connects the laminations that are neighboring each other and produces the electrically conducting connection, wherein the electrically conducting connection is provided for resistance measuring of the lamination pack.

* * * * *